United States Patent
Bei

(10) Patent No.: US 11,042,077 B2
(45) Date of Patent: Jun. 22, 2021

(54) GIMBAL SUPPORTING FRAME

(71) Applicant: SZ DJI OSMO TECHNOLOGY CO., LTD., Shenzhen (CN)

(72) Inventor: Shimeng Bei, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/594,952

(22) Filed: Oct. 7, 2019

(65) Prior Publication Data

US 2020/0041068 A1    Feb. 6, 2020

Related U.S. Application Data

(63) Continuation of application No. PCT/CN2017/088342, filed on Jun. 14, 2017.

(30) Foreign Application Priority Data

Apr. 21, 2017    (CN) .......................... 201720429133.X

(51) Int. Cl.
| | |
|---|---|
| *G03B 17/56* | (2021.01) |
| *F16M 11/16* | (2006.01) |
| *F16M 13/04* | (2006.01) |
| *F16M 11/04* | (2006.01) |

(52) U.S. Cl.
CPC .......... *G03B 17/561* (2013.01); *F16M 11/041* (2013.01); *F16M 11/16* (2013.01); *F16M 13/04* (2013.01); *G03B 17/563* (2013.01); *F16M 2200/08* (2013.01)

(58) Field of Classification Search
CPC .................................................. G03B 17/563
See application file for complete search history.

(56) References Cited

U.S. PATENT DOCUMENTS

| 7,033,088 B2 * | 4/2006 | Figgis ................... F16M 13/04 |
| | | 396/420 |
| 9,039,307 B2 * | 5/2015 | Lecuna Aguerrevere ................... |
| | | G03B 17/561 |
| | | 396/420 |

FOREIGN PATENT DOCUMENTS

| AU | 2011379604 A1 | 7/2013 |
| CN | 203927315 U | 11/2014 |
| CN | 203930299 U | 11/2014 |
| CN | 204083738 U | 1/2015 |
| CN | 204213121 U | 3/2015 |
| CN | 204739394 U | 11/2015 |
| CN | 204805906 U | 11/2015 |

(Continued)

OTHER PUBLICATIONS

FreeFly MoVI Pro product page https://freeflysystems.com/movi-pro Archive.org copy dated Nov. 5, 2016 (Year: 2016).*

(Continued)

*Primary Examiner* — Clayton E. LaBalle
*Assistant Examiner* — Leon W Rhodes, Jr.
(74) *Attorney, Agent, or Firm* — Anova Law Group, PLLC

(57) ABSTRACT

A gimbal supporting frame includes a handheld ring. The handheld ring includes a supporting assembly disposed at a lower portion of the handheld ring, and a mounting member configured to mount an imaging device and provided at an upper portion of the handheld ring. The mounting member is configured to protrude upwardly relative to the handheld ring and is located at a center location of the upper portion of the handheld ring.

20 Claims, 26 Drawing Sheets

(56) References Cited

FOREIGN PATENT DOCUMENTS

CN 205350746 U 6/2016
WO WO-2018209772 A1 * 11/2018 ............ F16M 11/04

OTHER PUBLICATIONS

"Introducing MoVI Pro" video at https://www.youtube.com/watch?v=_IzBTBn9kG0 indicating publication on Nov. 2, 2016 screenshots of referenced times attached (Year: 2016).*
Freefly Movi Pro Operation Manual dated Mar. 1, 2017, retrieved from https://freeflysystems.com/app/uploads/2016/10/MoVI_Pro_Manual_Revision_B.pdf (Year: 2017).*
Truss Genius product page for Global Truss Black Mini 360 QR clamp, https://trussgenius.com/shop/matte-black-mini-360-qr-clamp-global/, archive.org copy dated Apr. 4, 2016 (Year: 2016).*
The World Intellectual Property Organization (WIPO) International Search Report for PCT/CN2017/088342 dated Jan. 18, 2018 5 pages.

* cited by examiner

GIMBAL SUPPORTING FRAME

CROSS-REFERENCE TO RELATED APPLICATIONS

This application is a continuation application of International Application No. PCT/CN2017/088342, filed on Jun. 14, 2017, which claims priority to Chinese Patent Application No. 201720429133.X, filed on Apr. 21, 2017, the entire contents of both of which are incorporated herein by reference.

TECHNICAL FIELD

The present disclosure relates to the technology field of gimbal devices and, more particularly, to a gimbal supporting frame.

BACKGROUND

An imaging apparatus typically includes a gimbal (e.g., a handheld gimbal) and an imaging device carried by the gimbal. The gimbal may be configured to secure the imaging device and to adjust the attitude of the imaging device (e.g., adjusting the height and the direction of the imaging device). The gimbal may also be configured to stably maintain a specified attitude of the imaging device, thereby realizing stable, smooth, and multi-angle photographing by the imaging device.

A typical gimbal can be mounted to different platforms for photographing under different scenes. These platforms may include aircrafts, ground-based movable devices, or handheld rod. For example, a gimbal may be mounted to an aircraft for aerial photographing, mounted to a top of a vehicle for following and photographing an object, or mounted to a handheld rod for a photographer to control the movement of the gimbal.

However, the volume and the weight of the gimbal are typically large. When the gimbal is carried by a handheld rod for the photographer to control, all the weight is carried by the photographer, which adds burden to the photographer. Recently, people in the industry has proposed to add a gimbal support frame to the handheld rod that may be directly placed on the ground or floor, and to mount the gimbal to the gimbal support frame, such that the gimbal may be either handheld by a user, or supported by the gimbal support frame stably standing on the ground. The gimbal support frame makes it convenient for a user to use the gimbal for static photographing, and provides excellent stability for the gimbal, thereby achieving better photographing effect. However, a currently available gimbal support frame typically includes a relatively low geometric center. When the gimbal is mounted to the gimbal support frame, the center of gravity of the gimbal is relatively high. Thus, the distance between the center of gravity of the gimbal and the geometric center of the gimbal support frame is relatively long. When a photographer holds the gimbal support frame by hand to control the angle in the pitch axis (i.e., pitch angle) of a load, the photographer needs to increase the force to overcome the torque. Thus, a currently available gimbal support frame still adds burden to the photographer.

SUMMARY

In accordance with an aspect of the present disclosure, there is provided a gimbal supporting frame. The gimbal supporting frame includes a handheld ring. The handheld ring includes a supporting assembly disposed at a lower portion of the handheld ring, and a mounting member configured to mount an imaging device and provided at an upper portion of the handheld ring. The mounting member is configured to protrude upwardly relative to the handheld ring and is located at a center location of the upper portion of the handheld ring.

In various embodiments of the disclosed gimbal support frame, a mounting member is disposed protruding upwards relative to a handheld ring. When an imaging device is mounted to the gimbal support frame, the imaging device may be positioned closer to the geometric center of the gimbal support frame. As a result, when a user handholds the gimbal support frame to control the pitch angle of the load, the torque that the user needs to overcome may be effectively reduced, thereby reducing the burden on the user.

BRIEF DESCRIPTION OF THE DRAWINGS

To better describe the technical solutions of the various embodiments of the present disclosure, the accompanying drawings showing the various embodiments will be briefly described. As a person of ordinary skill in the art would appreciate, the drawings show only some embodiments of the present disclosure. Without departing from the scope of the present disclosure, those having ordinary skills in the art could derive other embodiments and drawings based on the disclosed drawings without inventive efforts.

DETAILED DESCRIPTION OF THE EMBODIMENTS

Figure 1:
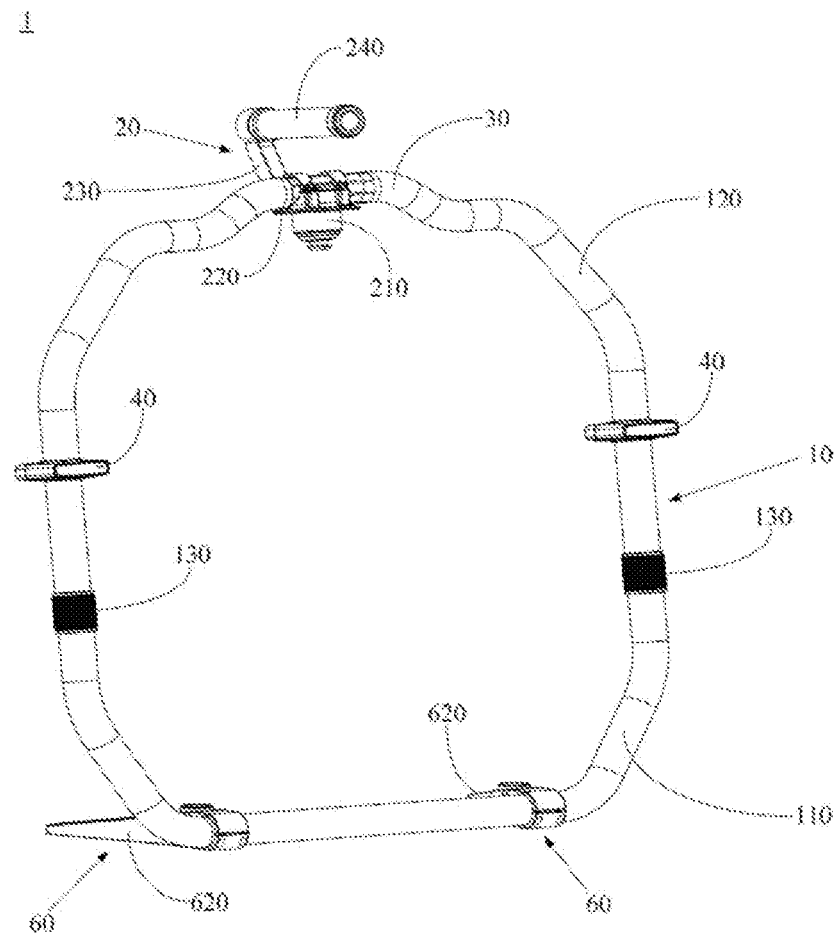
FIG. 1 is a perspective view of a gimbal support frame from a first perspective, according to an example embodiment.

Technical solutions of the present disclosure will be described in detail with reference to the drawings, in which the same numbers refer to the same or similar elements unless otherwise specified. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

In the present disclosure, terms are for the purpose of describing the specific embodiments, and are not intended to limit the scope of the present disclosure. In the specification and claims, singular forms "a," "an," and "the" are intended to include the plural forms as well, unless the context indicates otherwise. And, the terms "comprise," "comprising," "include," and the like specify the presence of stated features, steps, operations, elements, and/or components but do not preclude the presence or addition of one or more other features, steps, operations, elements, components, and/or groups. The term "and/or" used herein includes any suitable combination of one or more related items listed.

In the present disclosure, relational terms such as first, second, third, etc., may be used to described various information. However, the various information is not limited to these terms. These terms are only used to distinguish information of a same type. For example, without departing from the scope of the present disclosure, the first information may alternatively be referred to as the second information. Likewise, the second information may alternatively be referred to as the first information.

As used herein, when a first component (or unit, element, member, part, piece) is referred to as "coupled," "mounted," "fixed," "secured" to or with a second component, it is intended that the first component may be directly coupled, mounted, fixed, or secured to or with the second component, or may be indirectly coupled, mounted, or fixed to or with the second component via another intermediate component. The terms "coupled," "mounted," "fixed," and "secured" do not necessarily imply that a first component is permanently coupled with a second component. The first component may be detachably coupled with the second component when these terms are used. When a first component is referred to as "connected" to or with a second component, it is intended that the first component may be directly connected to or with the second component or may be indirectly connected to or with the second component via an intermediate component. The connection may include mechanical and/or electrical connections. The connection may be permanent or detachable. The electrical connection may be wired or wireless. When a first component is referred to as "disposed," "located," or "provided" on a second component, the first component may be directly disposed, located, or provided on the second component or may be indirectly disposed, located, or provided on the second component via an intermediate component. When a first component is referred to as "disposed," "located," or "provided" in a second component, the first component may be partially or entirely disposed, located, or provided in, inside, or within the second component.

The gimbal supporting frame of the present disclosure will be described with reference to the accompanying drawings. The various embodiments and features included in the embodiments may be combined in any suitable manner, unless there is an explicitly noted conflict.

Figure 2:
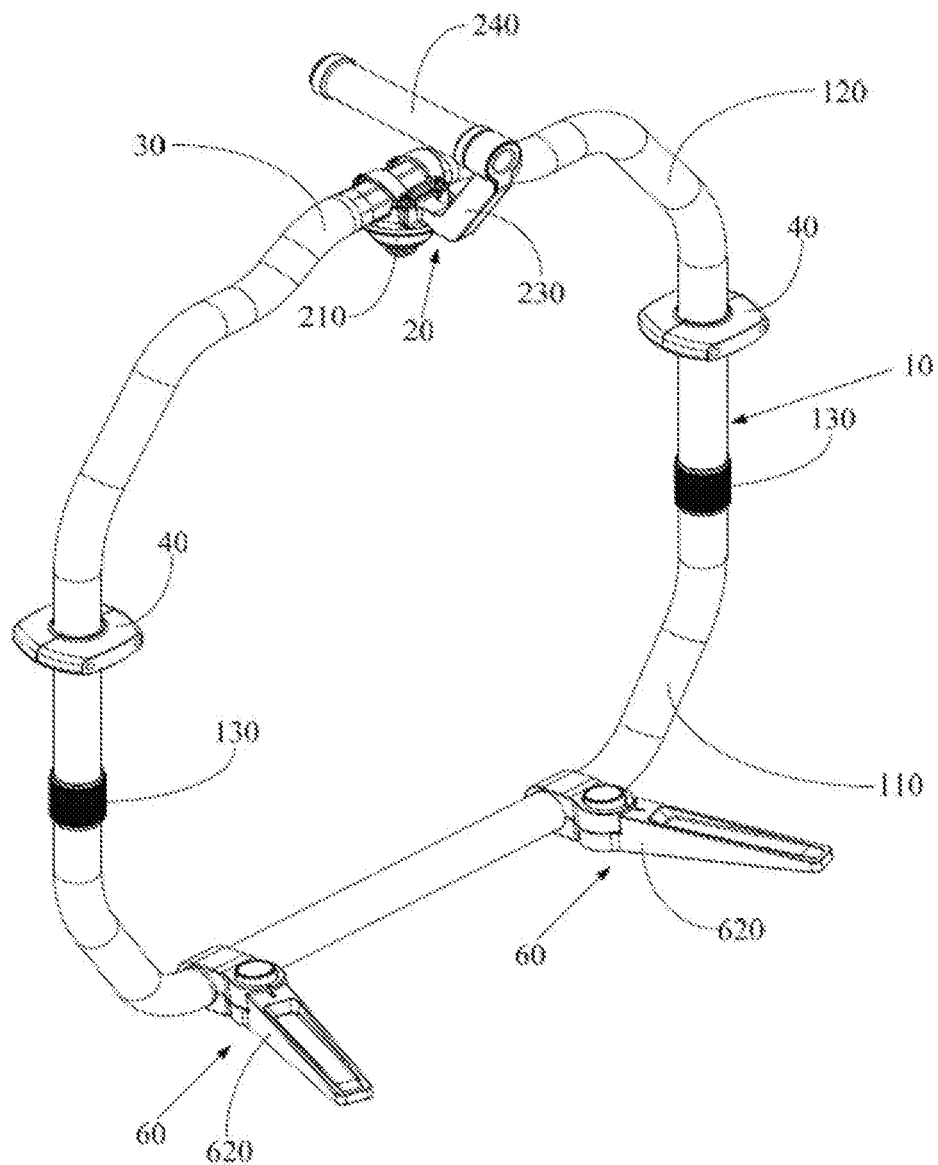
FIG. 2 is a perspective view of the gimbal support frame from a second perspective, according to an example embodiment.

Referring to FIG. 1 and FIG. 2, a gimbal supporting frame 1 may include a handheld ring 10. An upper portion of the handheld ring 10 may be used as a mounting member 30 or may include a mounting member 30 for mounting an imaging device. The mounting member 30 may be configured to protrude upwardly relative to the handheld ring 10 and may be located at a center location of the upper portion of the handheld ring 10. By configuring the mounting member 30 to protrude upwardly relative to the handheld 10, the location of the imaging device may be closer to the geometric center of the handheld ring 10, making it convenient for a user to handhold the gimbal supporting frame 1. After the imaging device is mounted to the gimbal supporting frame 1, the center of gravity of the imaging device may be higher, such that the center of gravity of the imaging device is closer to the geometric center of the gimbal supporting frame 1. As a result, when a user holds by hand the gimbal supporting frame 1 to control a pitch angle of a load, a torque the user needs to overcome is effectively reduced, thereby reducing the burden of the user. In some embodiments, the handheld ring 10 may include a ring-shaped tube structure including a tube. The tube may include any suitable material and dimension. In some embodiments, the tube may be a carbon tube having a 30 mm diameter. The thickness of a wall of the tube may be 1.5 mm, and thus the tube may provide sufficient strength to support the gimbal supporting frame 1, and may have a relatively lighter weight. The ring part of the handheld ring 10 may be configured for mounting a surveillance camera, an image transfer device, etc.

In some embodiments, a handle 20 may be provided at the center location of the mounting member 30 such that the user may hold the gimbal supporting frame 1 by hand. The handle is convenient for the user to carry when the imaging device needs to be moved to another place in a short distance. The two sides of the handheld ring 10 may also be used as handhold regions for a user to hold. The two sides of the handheld ring 10 may be provided with blocking support members 40 that may be sleeve-fit with handheld ring 10. The blocking support members 40 may be configured to be movable along the handheld ring 10, which makes it convenient to adjust the height of the handheld ring 10 when the handheld ring 10 is used by different users to find a location that can provide the best hand feel. When the user holds by hand the gimbal supporting frame 10 to perform photographing, the user may hold the two sides of the handheld ring 10. The blocking support members 40 may be moved to above the handholding locations. The blocking support members 40 may provide support to user's hands to enable the user to more stably handhold the gimbal supporting frame 1, and to make it difficult for the user's hands to slide off of the handheld ring 10 or to move along the handheld ring 10. A lower portion of the handheld ring 10 may be provided with a supporting assembly 60 configured to support the handheld ring 10. When the user does not need to handhold the gimbal supporting frame 10 for photographing, the user may place the gimbal supporting frame 1 on the ground or other fixed platform, with the supporting assembly 60 supporting the gimbal supporting frame 1 on the ground to provide excellent support. The center of gravity of the imaging device may fall on the supporting assembly 60.

The handheld ring 10 of the gimbal supporting frame 1 will be described with reference to FIG. 3 to FIG. 5.

Figure 3:
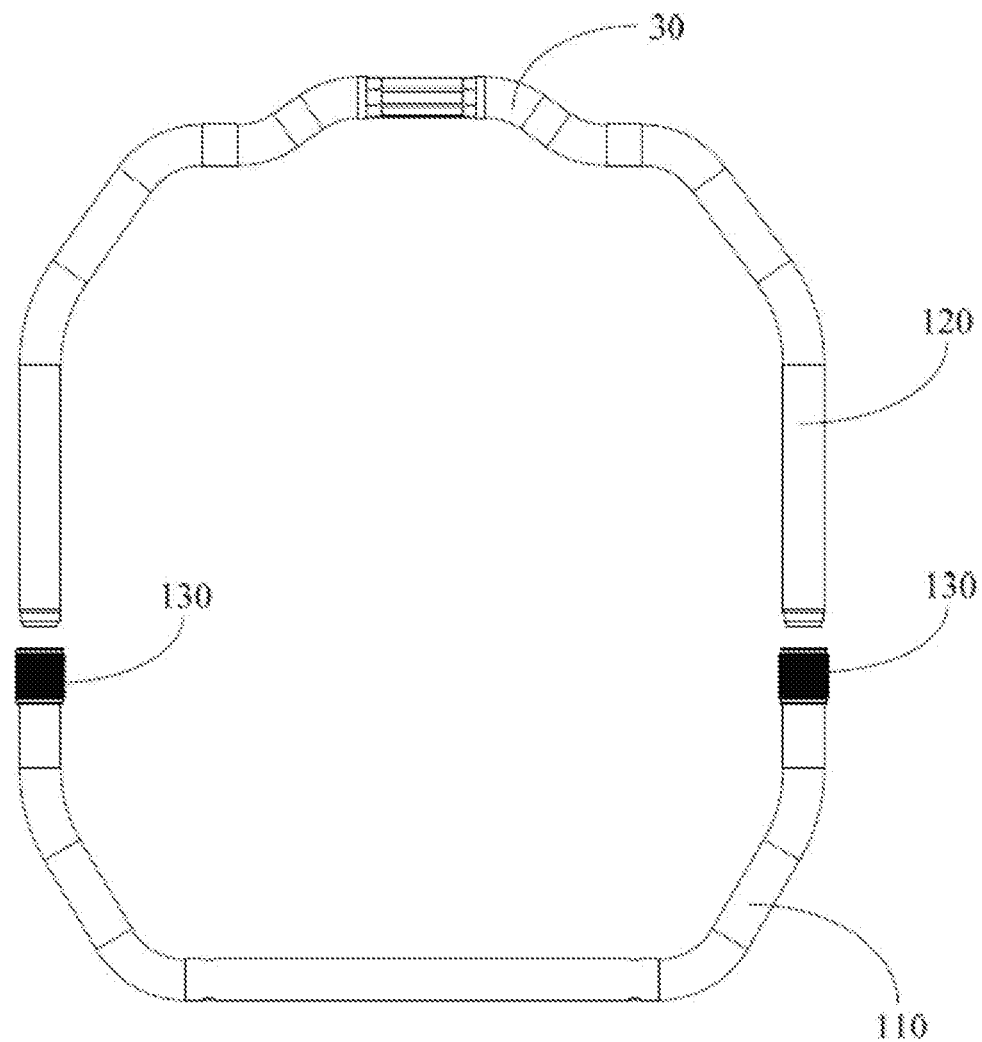
FIG. 3 is a schematic view of a disassembled handheld ring of the gimbal support frame, according to an example embodiment.
Figure 4:
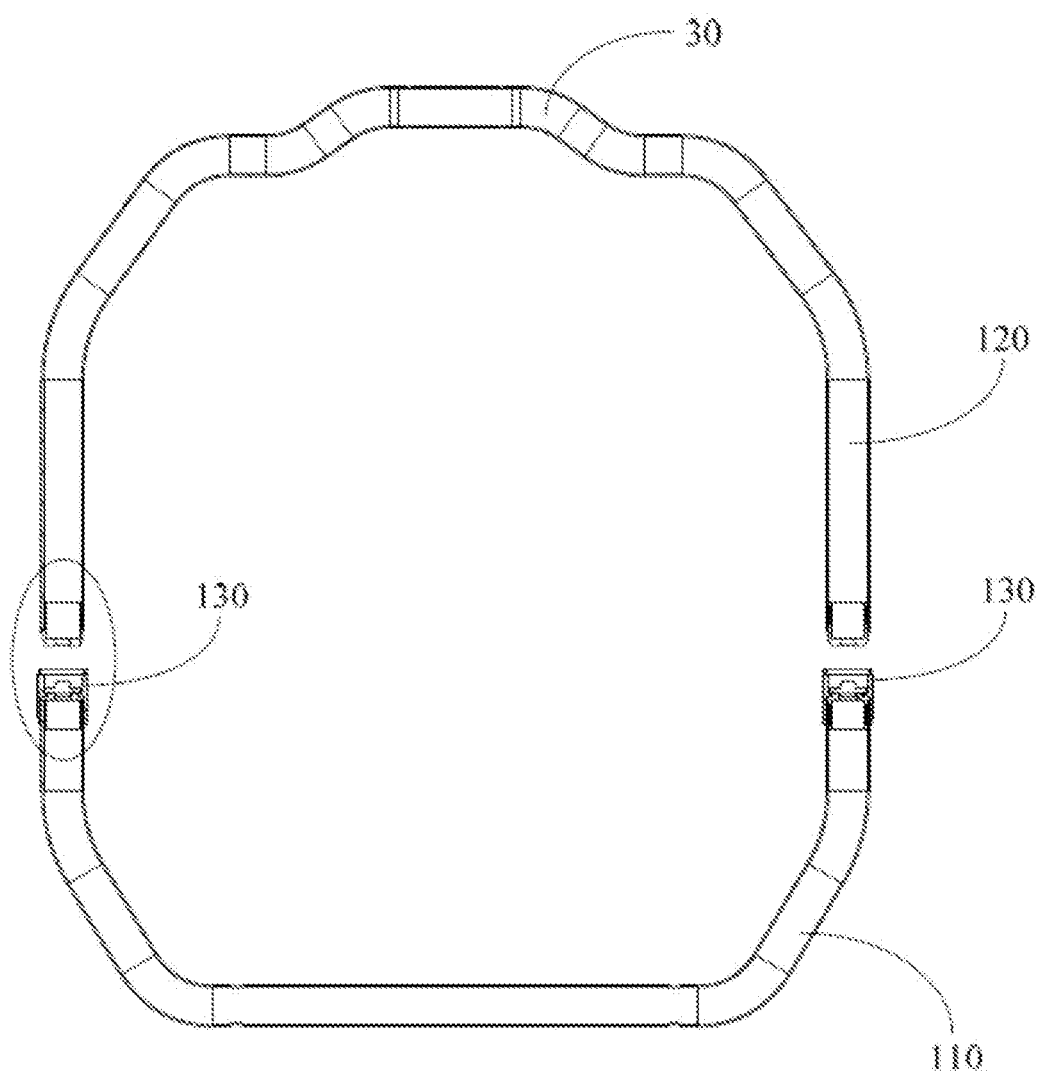
FIG. 4 is a cross sectional view of the handheld ring of FIG. 3, according to an example embodiment.

As shown in FIG. 3 and FIG. 4, in some embodiments, the handheld ring 10 may have a ring-shaped tube structure including at least one tube. The handheld ring 10 may include a first tube 110 and a second tube 120. The first tube 110 and the second tube 120 may be detachably connected with one another.

In some embodiments, two sides of the first tube 110 and the second tube 120 may be provided with connecting ends configured to fittingly connect with one another. The connecting ends at the two sides of the first tube 110 may each include a threaded sleeve tube 130. The outer surfaces of the connecting ends at the two sides of the second tube 120 may each be provided with a threaded connecting member configured to fit with the threaded sleeve tube 130. The threaded sleeve tube 130 may engage with the threaded connecting member to pull the first tube 110 and the second tube 120 tightly together, or to loosen the connection between the first tube 110 and the second tube 120. After the first tube 110 and the second tube 120 are connected together, the threaded sleeve tube 130 may be rotated relative to the threaded connecting member to pull the first tube 110 and the second tube 120 together tightly to form an integral piece, thereby forming the handheld ring 10. When the threaded sleeve tube 130 is rotated to loosen the connection with the threaded connecting member, and when the threaded sleeve tube 130 is disengaged from the threaded connecting member, the first tube 110 and the second tube 120 may be disengaged. As a result, the handheld ring 10 may be quickly disassembled, which makes it convenient to carry, store, and transport the gimbal supporting frame 1. After the first tube 110 and the second tube 120 are disassembled from one another, a handheld rod may replace the first tube 110, thereby changing the way for handholding the gimbal supporting frame 1. The handheld rod may be connected with the second tube 120, thereby realizing a light-weight and convenient handheld operation mode. This configuration eliminates the weight of the first tube 110, which enables a user to handhold the gimbal supporting frame 1 to perform photographing at an even lower angle. This configuration brings more convenience to the user to perform handholding photographing.

Figure 5:
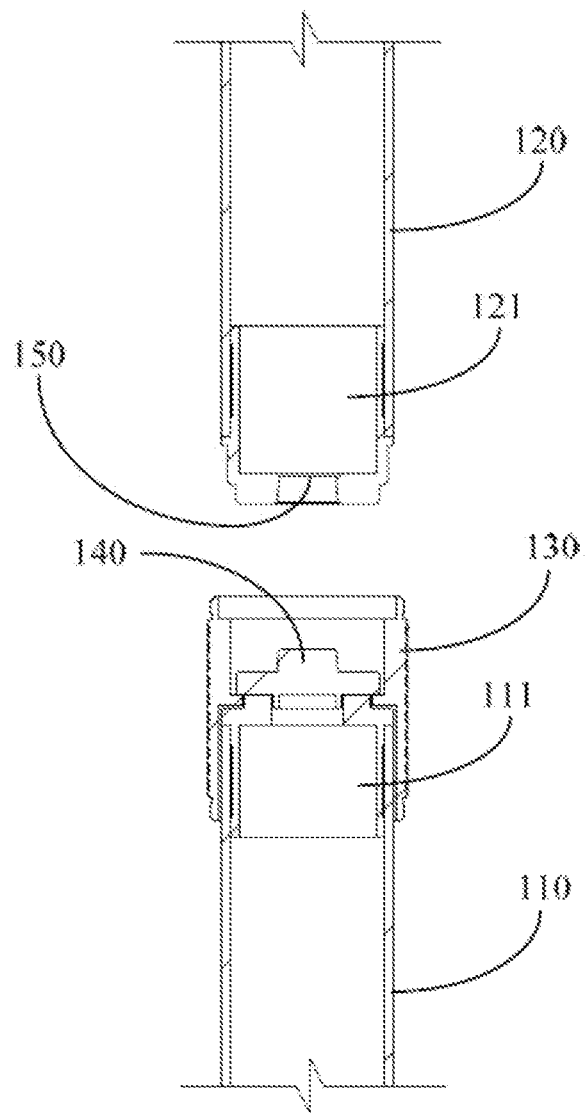
FIG. 5 is a regional enlarged view of the handheld ring of FIG. 4, according to an example embodiment.

As shown in FIG. 5, in some embodiments, to restrain the first tube 110 and the second tube 120 from rotate relative to one another after being connected, each connecting end of the first tube 110 may be provided with a position limiting block 140. Each connecting end of the second tube 120 may be provided with a position limiting groove 150 configured to fit with the position limiting block 140. In some embodiments, the position limiting block 140 may include a part having a tapered head. The position limiting groove 150 may include a part having a tapered hole to correspondingly fit with the part of the position limiting block 140 having a tapered head.

In some embodiments, when the handheld ring 10 includes the ring-shaped tube structure including a tube, the connecting ends of the first tube 110 may be embedded with a first embedded member 111. The position limiting block 140 may be disposed on the first embedded member 111. The connecting ends of the second tube 120 may be embedded with a second embedded member 121. The position limiting groove 150 may be disposed on the second embedded member 121. After the first tube 110 and the second tube 120 are connected, the position limiting block 140 may be snap-fit in the position limiting groove 150, thereby limiting the positions of the first tube 110 and the second tube 120 and restraining the first tube 110 and the second tube 120 from rotating relative to one another after being connected.

The blocking support member 40 of the gimbal supporting frame 1 will be described with reference to FIG. 6 to FIG. 13. The blocking support member 40 may include a first blocking support part 410, a second blocking support part 420, and a connecting assembly configured to connect the first blocking support part 410 and the second blocking support part 420. The connecting assembly may be configured to adjust the first blocking support part 410 and the second blocking support part 420 to tighten or loosen the handheld ring 10.

Figure 6:
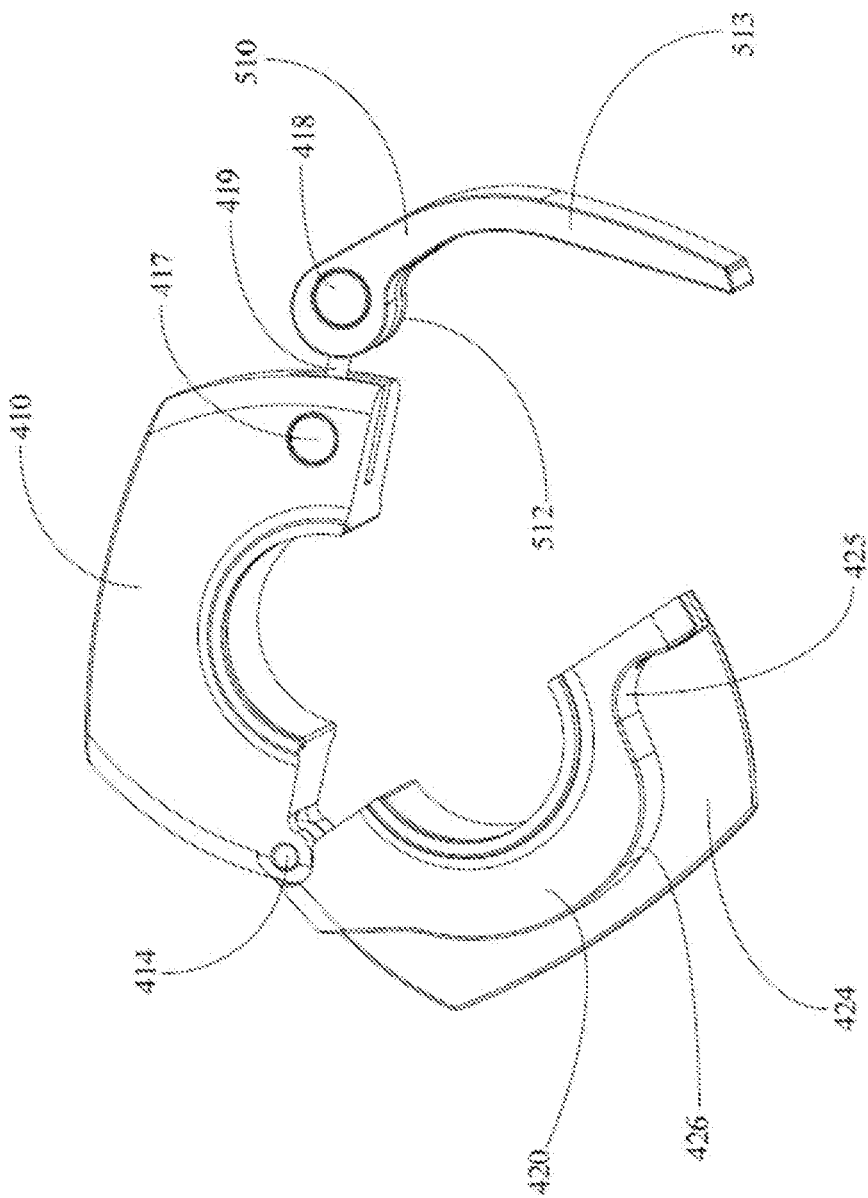
FIG. 6 is a perspective view of a blocking support member of the gimbal support frame, according to an example embodiment.
Figure 7:
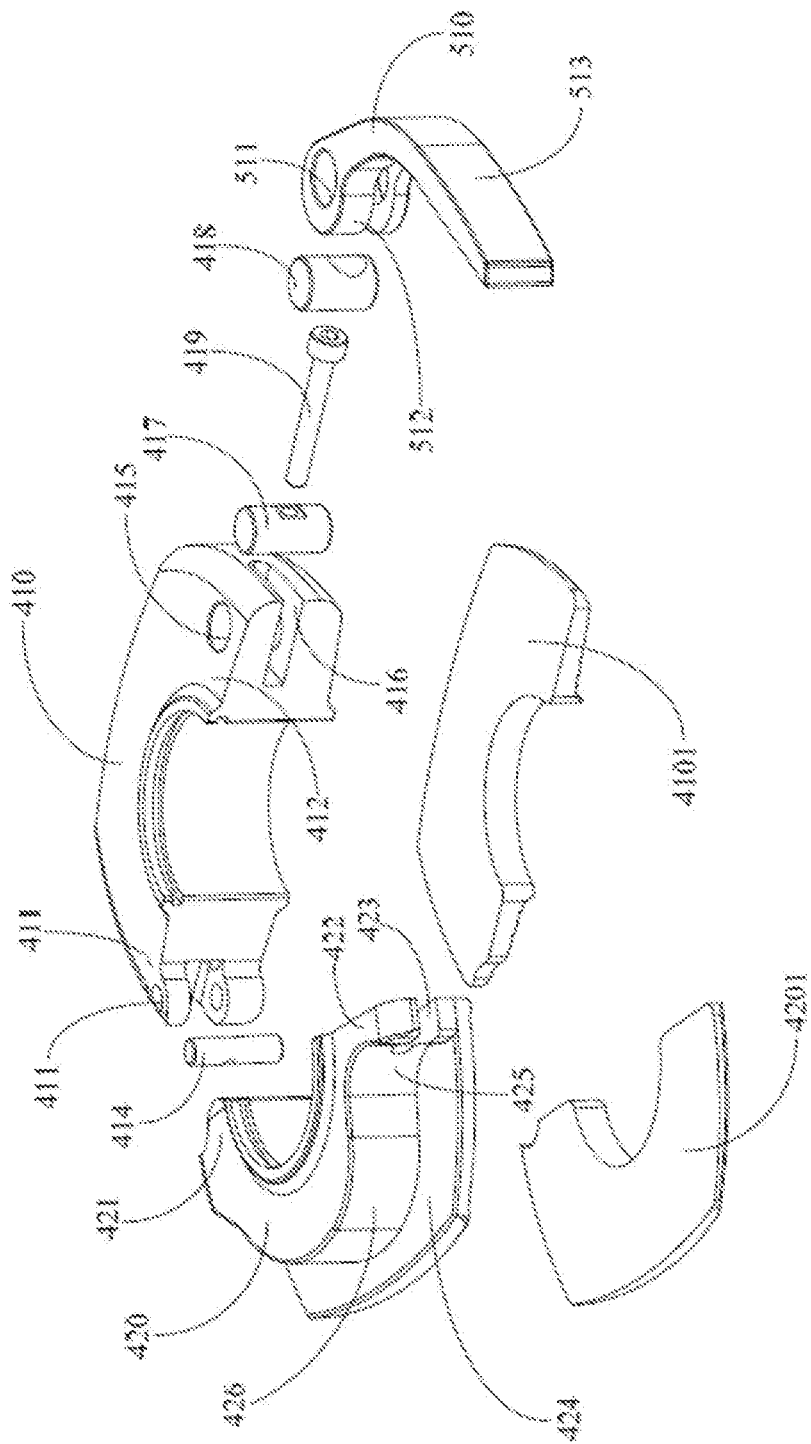
FIG. 7 is an exploded view of the blocking support member of FIG. 6, according to an example embodiment.
Figure 8:
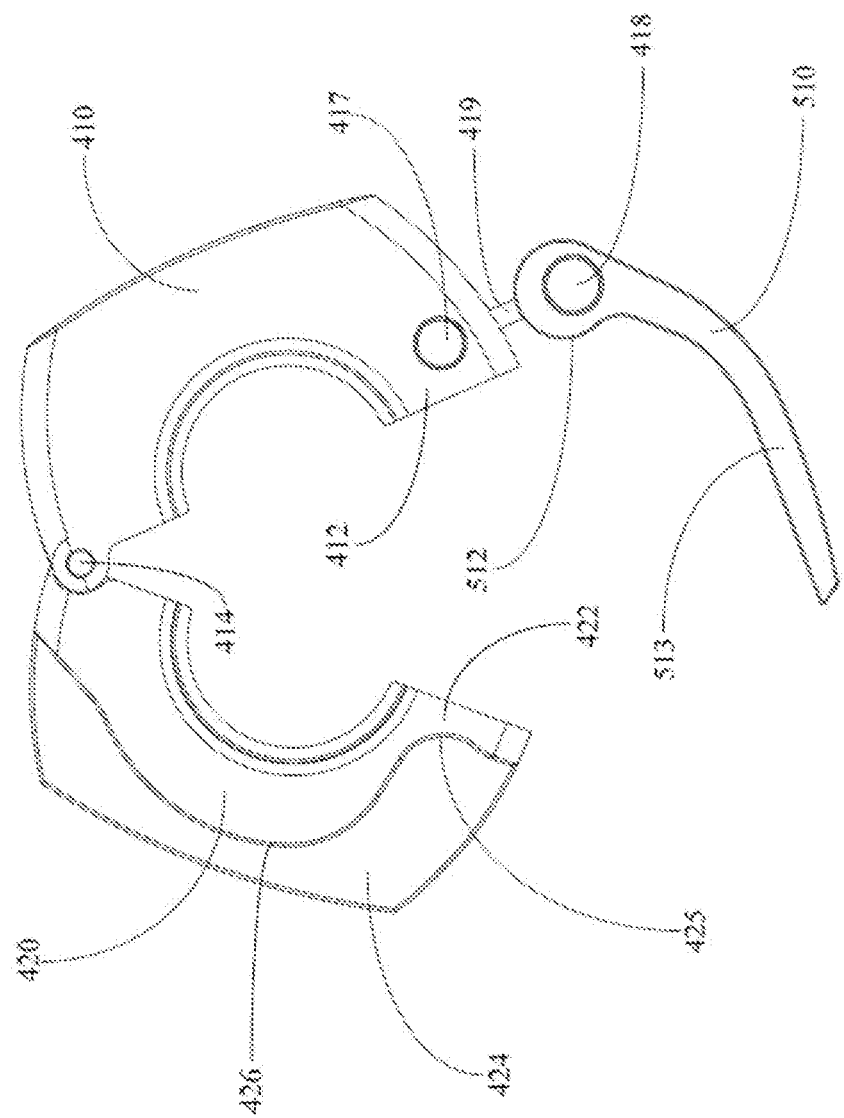
FIG. 8 is a schematic view of a status of the blocking support member when used, according to an example embodiment.

As shown in FIG. 6 and FIG. 7, in some embodiments, a first end 411 of the first blocking support part 410 and a first end 421 of the second blocking support part 420 are hinge connected. The connecting assembly may include a first adjusting member 510 disposed at a second end of the first blocking support part 410. The first adjusting member 510 may be configured to change an angle between the first blocking support part 410 and the second blocking support part 420. The connecting assembly may also include a rotation assembly. The first adjusting member 510 may include a cam. The cam may be connected with a second end 412 of the first blocking support part 410 through the rotation assembly (i.e., two ends of the rotation assembly may be connected with the second end 412 of the first blocking support part 410 and the cam respectively). An outer surface of the second blocking support part 420 may be provided with a receiving groove 424 corresponding to the first adjusting member 510. The cam may be received in the receiving groove 424 as a result of the rotation of the rotation assembly around the second end 412 of the first blocking support part 410, thereby connecting the first blocking support part 410 and the second blocking support part 420. The cam may abut against the receiving groove 424 when the cam rotates around the rotation assembly, thereby causing the first blocking support part 410 and the second blocking support part 420 to tightly clamp the handheld ring 10. In some embodiments, a bottom portion of the first blocking support part 410 may be provided with a first blocking rubber pad 4101. A bottom portion of the second blocking support part 420 may be provided with a second blocking rubber pad 4201. The blocking rubber pads may not only function to protect the first blocking support part 410 and the second blocking support part 420, but also improve the hand feel.

In some embodiments, the first end 411 of the first blocking support part 410 and the first end 421 of the second blocking support part 420 may be respectively provided with a first rotation shaft hole 413 penetrating throughout the thickness direction. The first rotation shaft hole 413 of the first blocking support part 410 and the first rotation hole 413 of the second blocking support part 420 may be provided with a first rotation shaft 414, thereby realizing the hinge connection between the first end 411 of the first blocking support part 410 and the first end 421 of the second blocking support part 420.

In some embodiments, the second end 412 of the first blocking support part 410 may be provided with a second rotation shaft hole 415 penetrating throughout the thickness direction. The second rotation shaft hole 415 may be provided with a first rotation groove 416. The second end 422 of the second blocking support part 420 may be provided with a second rotation groove 423 corresponding to the first rotation groove 416. The first adjusting member 510 may be provided with a third rotation shaft hole 511 penetrating in the thickness direction.

In some embodiments, the rotation assembly may include a second rotation shaft 417 disposed in the second rotation shaft hole 415, a third rotation shaft 418 disposed in the third rotation shaft hole 511, a connection shaft 419 connected with the second rotation shaft 417 and disposed along the radial direction of the second rotation shaft 417. The connecting shaft 419 may rotate in the first rotation groove 416 and the second rotation groove 423.

In some embodiments, the cam may include a cam abutting support member 512 and a cam handle 513. The receiving groove 424 may include an abutting groove 425 corresponding to the cam abutting support member 512 and a receiving groove 426 configured to receive the cam handle 513. The receiving groove 426 may correspond to the cam handle 513. When the first blocking support part 410 and the second blocking support part 420 clamp tightly, the cam handle 513 may be received in the receiving groove 426. The cam abutting support member 512 of the cam may abut against the abutting groove 425 of the receiving groove 424 when the cam abutting support member 512 rotates, thereby connecting or assembling the first blocking support part 410 and the second blocking support part 420 to tightly clamp the handheld ring 10.

Figure 9:
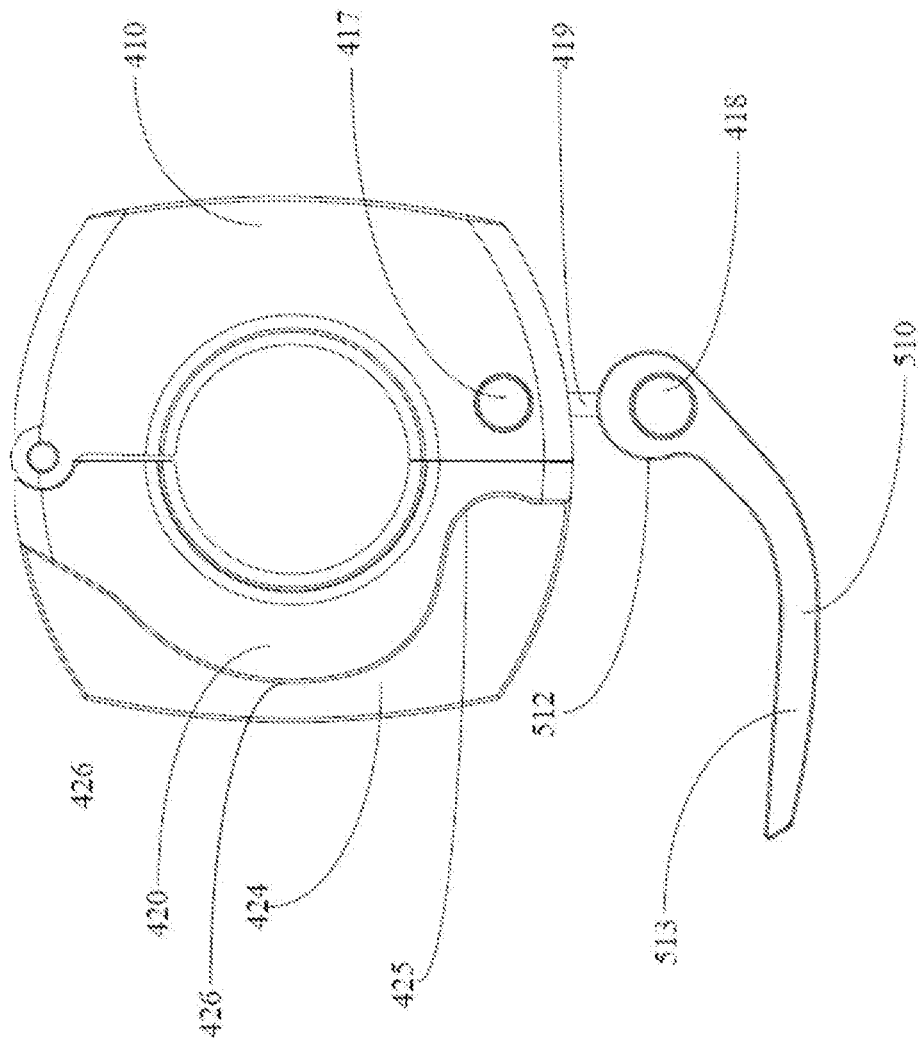
FIG. 9 is a schematic view of another status of the blocking support member when used, according to an example embodiment.
Figure 10:
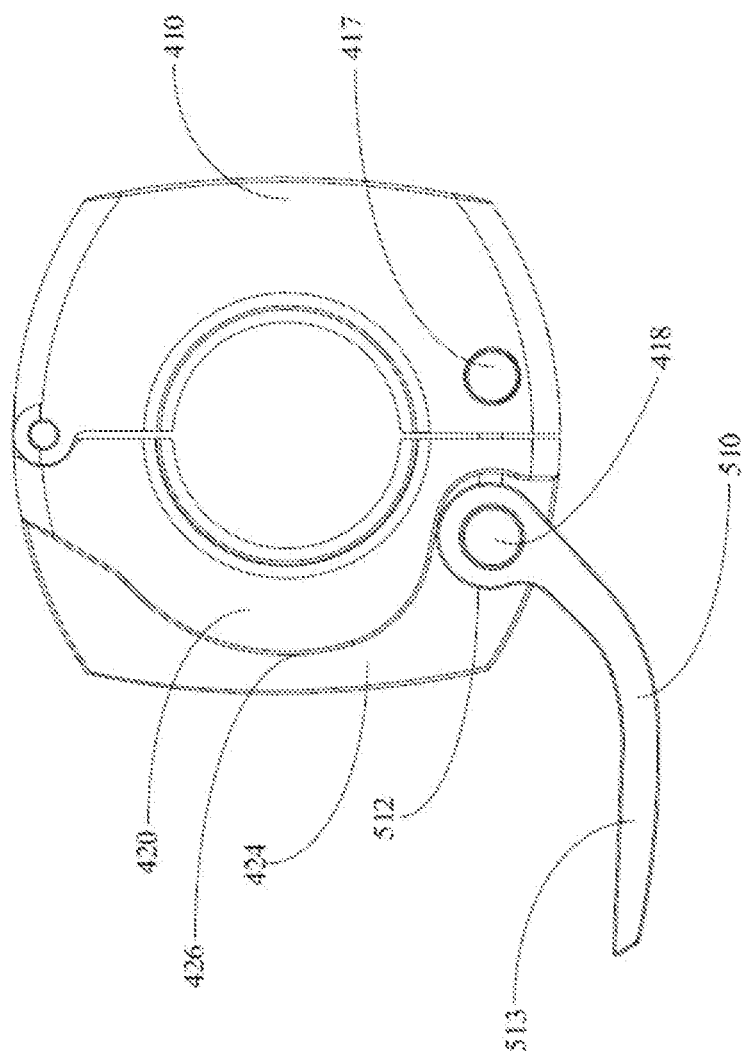
FIG. 10 is a schematic view of another status of the blocking support member when used, according to an example embodiment.
Figure 11:
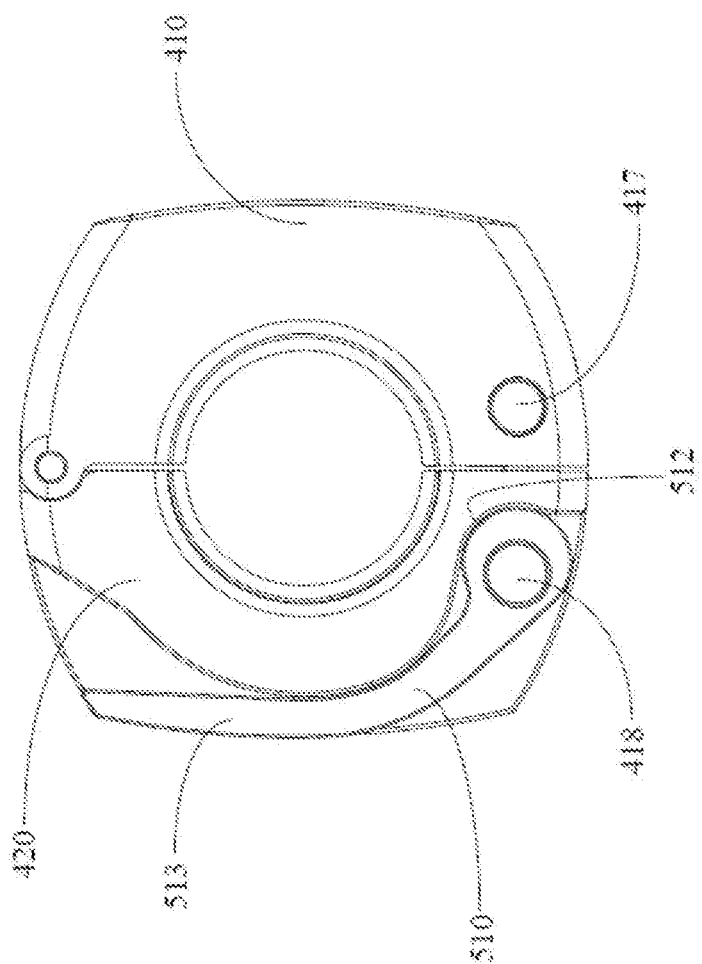
FIG. 11 is a schematic view of another status of the blocking support member when used, according to an example embodiment.

FIG. 8 to FIG. 11 schematically illustrate a process of assembling the first blocking support part 410 of the cam and the second blocking support part 420 of the cam to tighten or tightly clamp the handheld ring 10. The first end 411 of the first blocking support part 410 and the first end 421 of the second blocking support part 420 may first rotate, through the first rotation shaft 414, to cause the second end 412 of the first blocking support part 410 and the second end 422 of the second blocking support part 420 to dock or connect with one another, as shown in FIG. 9. Then, through the cam handle 513, the cam may be rotated through the second rotation shaft 417 around the second end 412 of the first blocking support part 410 until the handle 513 is received in the receiving groove 424. Then, through the cam handle 513, the cam is rotated around the third rotation shaft 418 until the abutting groove 425 of the receiving groove 424 abuts against by the cam abutting support member 512, thereby assembling the first blocking support part 410 and the second blocking support part 420 to clamp the handheld ring 10 tightly, as shown in FIG. 11. Following the above steps in a reverse order, the first blocking support part 410 and the second blocking support part 420 may be disassembled. Thus, the first blocking support part 410 and the second blocking support part 420 may be clamped tightly together or may be loosened, thereby realizing the quick disassembling of the blocking support member 40. The disclosed structure renders the gimbal supporting frame 1 easier to carry, store, and transport.

Figure 12:
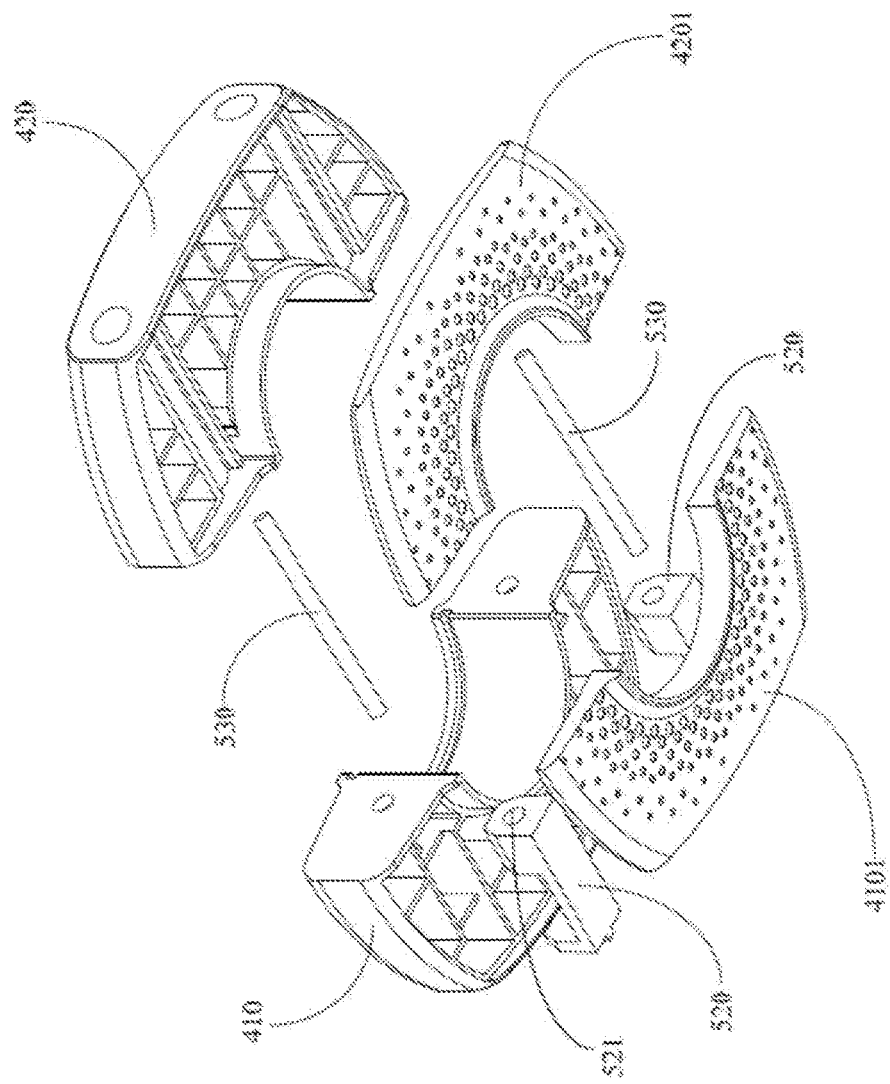
FIG. 12 is an exploded view of a blocking support member of the gimbal support frame, according to another example embodiment.

In some embodiments, as shown in FIG. 12, the connecting assembly may include a fixing member 520 disposed in the first blocking support part 410 and a second adjusting member 530 connected with the fixing member 520 and disposed in the second blocking support part 420. The fixing member 520 may include a threaded connecting hole 521. The second adjusting member 530 may include a threaded connecting part configured to fit with the threaded connecting hole 521.

In some embodiments, two ends of the first blocking support part 410 at two sides of the handheld ring 10 may be provided with a fixing member 520, respectively. Two ends of the second blocking support part 420 at two sides of the handheld ring 10 may be provided with a second adjusting member 530, respectively. The threaded connecting part of the second adjusting member 530 and the threaded connecting hole 521 of the fixing member 520 may be tightened together or loosened from one another, thereby realizing the tightening or loosening of the first blocking support part 410 and the second blocking support part 420. The disclosed structure may enable quick disassembling of the blocking support member 40, which renders the gimbal support frame 1 easy to carry, store, and transport. With the disclosed structure, the first blocking support part 410 and the second blocking support part 420 may be moved closer to or away from one another.

Figure 13:
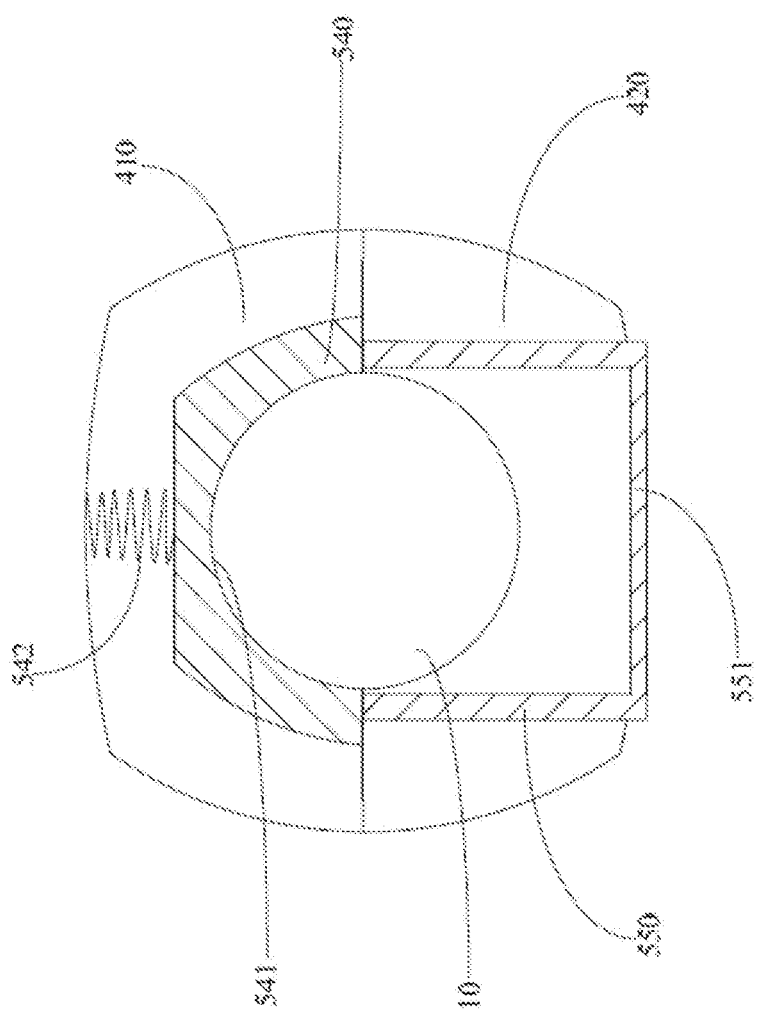
FIG. 13 is a schematic view of a structure of a blocking support member of the gimbal support frame, according to another example embodiment.

In some embodiments, as shown in FIG. 13, the connecting assembly may include an abutting member 540 disposed in the first blocking support part 410 and a first pressing member 550 disposed in the second blocking support part 420 and connected with the abutting member 540. A first end of the abutting member 540 may be provided with an abutting part 541 configured to abut against the handheld ring 10. A second end of the abutting member 540 may be provided with an elastic part 542 configured to abut against the first blocking support member 410. The first pressing member 550 may be provided with a pressing part 551 protruding from the second blocking support part 420. In some embodiments, the first blocking support part 410 and the second blocking support part 420 may be integrally formed or configured.

Figure 14:
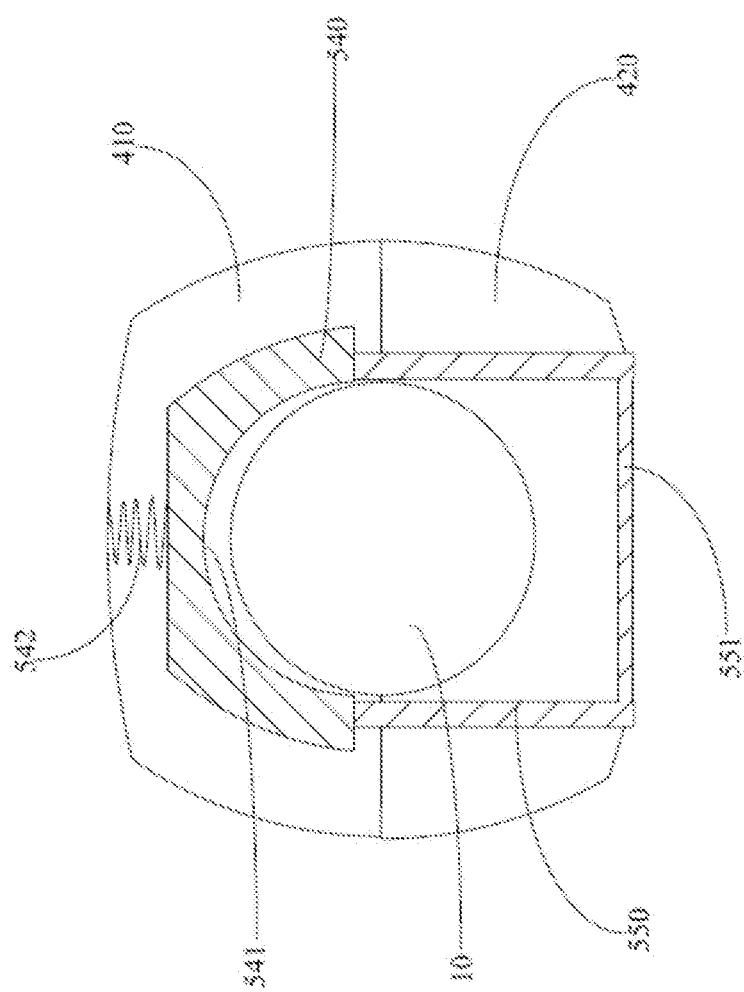
FIG. 14 is a schematic view of a structure of a blocking support member of the gimbal support frame, according to another example embodiment.

In some embodiments, as shown in FIG. 13, the abutting part 541 of the abutting member 540 may abut against the handheld ring 10 under the resilient force of the elastic part 542, thereby causing the first blocking support part 410 and the second blocking support part 420 to tightly clamp the handheld ring 10. As shown in FIG. 14, when the blocking support member 40 is adjusted, the pressing part 551 of the first pressing member 550 may be pressed down, causing the abutting part 541 of the abutting member 540 to move in a direction away from the handheld ring 10. This movement may cause the abutting part 541 of the abutting member 540 to separate from the handheld ring 10, thereby adjusting the location of the blocking support member 40. When the pressing part 551 of the first pressing member 550 is released, the abutting part 541 of the abutting member 540 may move in a direction closer to the handheld ring 10 under the resilient force of the elastic part 542, such that the abutting part 541 again abuts against the handheld ring 10, thereby causing the first blocking support part 410 and the second blocking support part 420 to again tightly clamp the handheld ring 10.

The supporting assembly 60 of the gimbal supporting frame 1 will be described below with reference to FIG. 15 to FIG. 24.

Figure 15:
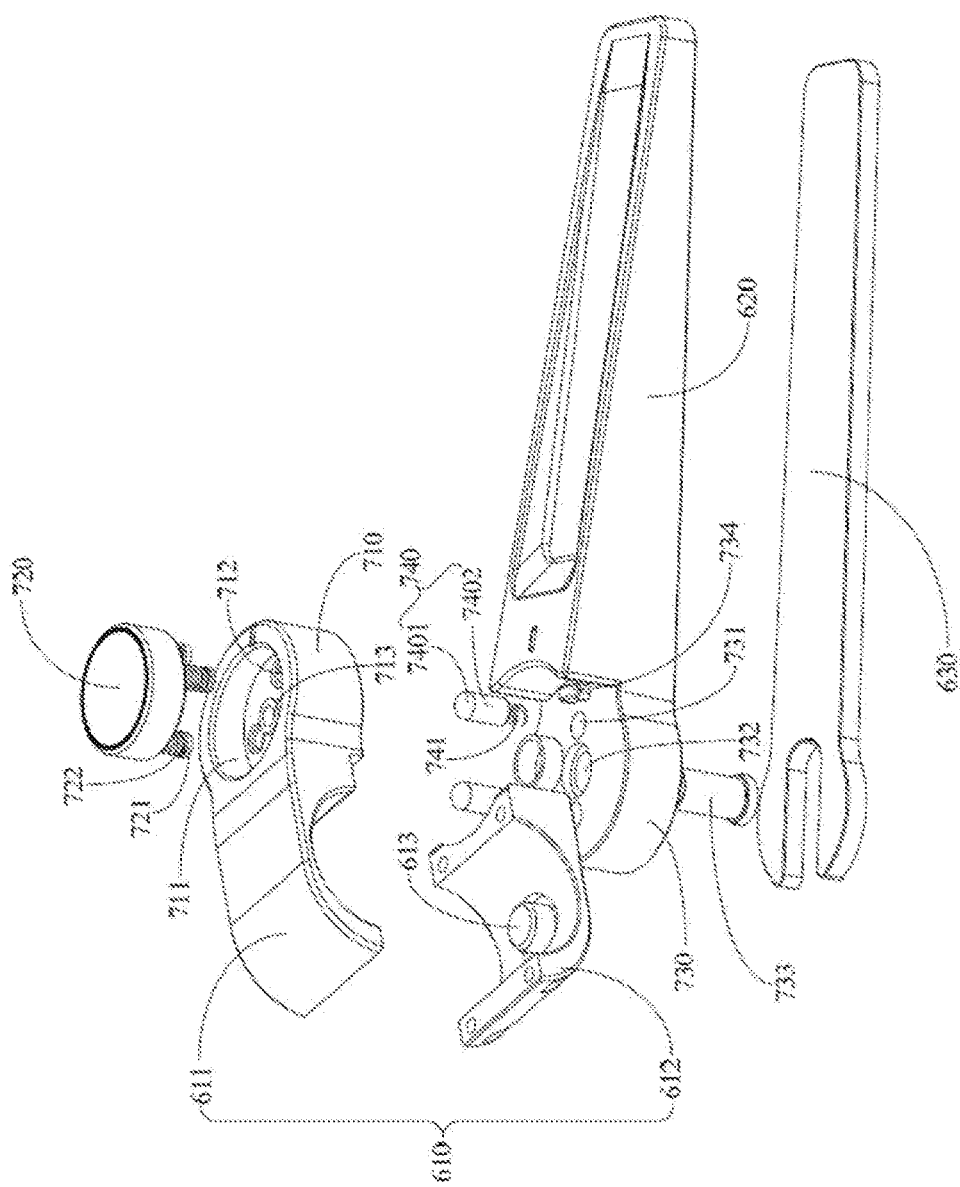
FIG. 15 is an exploded view of a supporting assembly of the gimbal support frame from a first perspective, according to an example embodiment.
Figure 16:
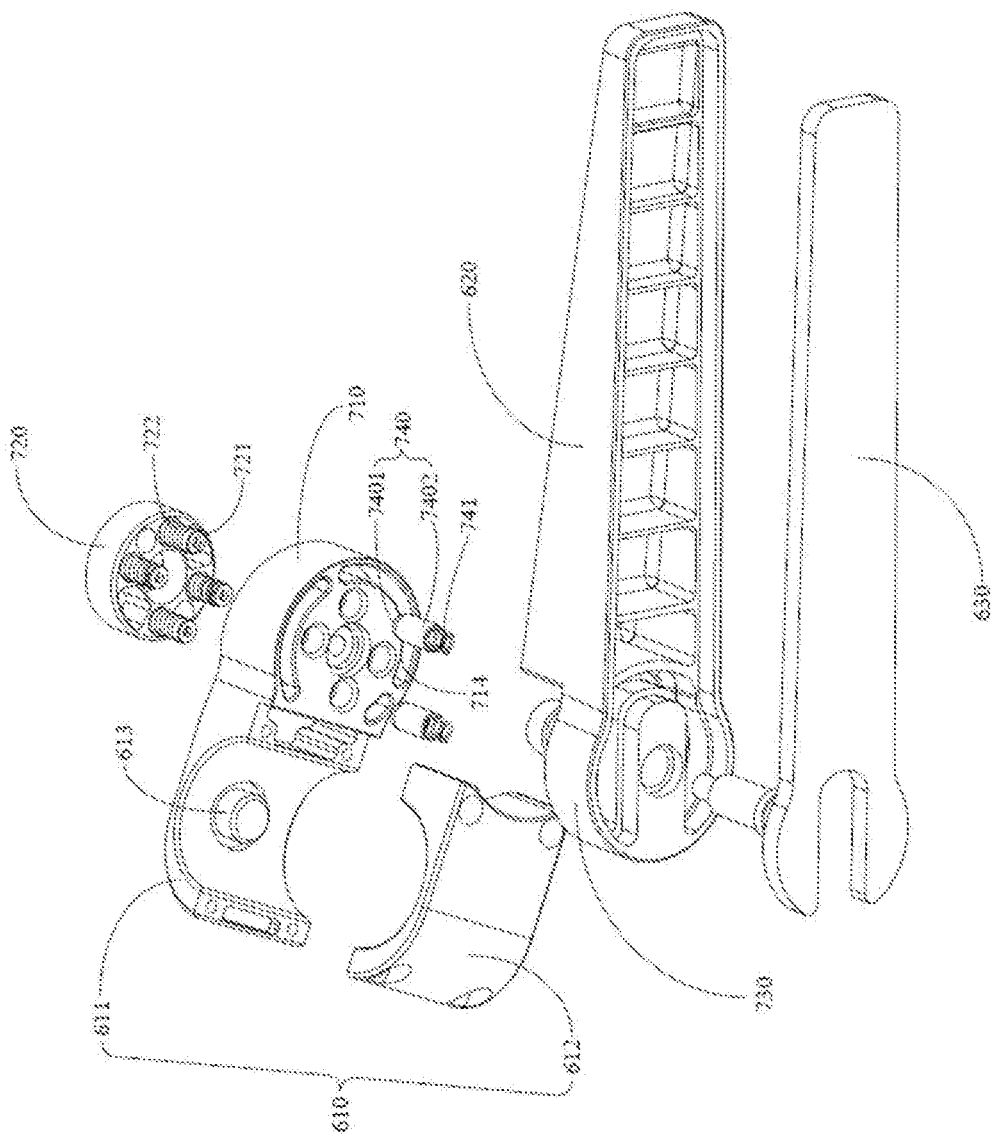
FIG. 16 is an exploded view of a supporting assembly of the gimbal support frame from a second perspective, according to an example embodiment.
Figure 17:
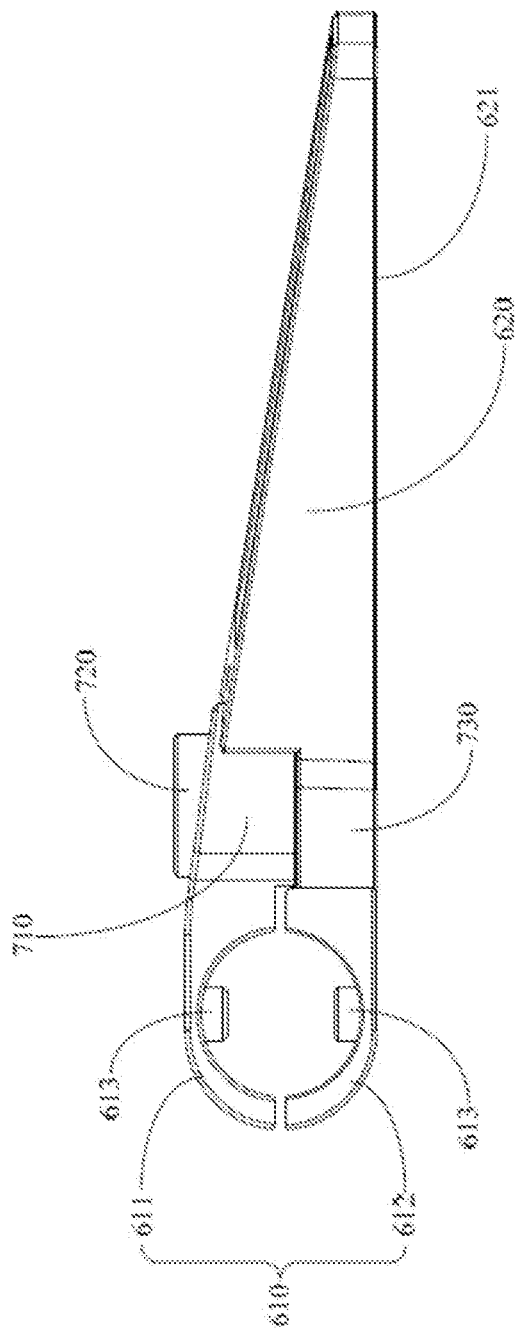
FIG. 17 is a front view of the supporting assembly of the gimbal support frame, according to an example embodiment.

As shown in FIG. 15 to FIG. 17, the supporting assembly 60 may include a grasping member 610 configured to sleeve-fit with a lower portion of the handheld ring 10 and a supporting member 620 configured to movably connect with the grasping member 610. An angle between the supporting member 620 and the grasping member 610 may be adjusted. The grasping member 610 may include a first grasping part 611 and a second grasping part 612 configured to assemble with one another.

In some embodiments, the grasping member 610 may include a first connecting part 710. The supporting member 620 may be configured to rotatably connect with the first connecting part 710 and may be lockable at a predetermined rotation angle. An elastic abutting member may be disposed between the first connecting part 710 and the supporting member 620. A receiving member configured to receive or hold the elastic abutting member may be disposed on one of the first connecting part 710 and the supporting member 620. When the elastic abutting member is received in the receiving member, the first connecting part 710 and the supporting member 620 may be locked together. When the elastic abutting member is compressed until the elastic abutting member exits the receiving member, the supporting member 620 may rotate relative to the first connecting part 710. The first connecting part 710 may include a second pressing member 720. The second pressing member 720 may be configured to compress the elastic abutting member until the elastic abutting member exits the receiving member.

The engaging relationship between the first connecting part 710, the elastic abutting member, and the second pressing member 720 will be described with reference to FIG. 15 to FIG. 17.

In some embodiments, the first connecting part 710 may be a laterally extended portion of the first grasping part 611 of the grasping member 610. A receiving chamber 711 may be disposed at an upper portion of the first connecting part 710. A plurality of positioning through holes 712 may be disposed at a lower portion of the first connecting part 710 and may be connected with the receiving chamber 711. The plurality of positioning through holes 712 may function as a receiving member. The plurality of positioning through holes 712 may be evenly distributed along the circumference of the first connecting part 710. The second connecting part 730 may be a laterally extended portion of the supporting member 620. The second connecting part 730 may include a first receiving hole 731 located corresponding to at least one of the positioning through holes 712.

In some embodiments, the elastic abutting member may include a locking member 740. The number of the locking member 740 may correspond to the number of the first receiving hole 731. The locking member 740 may fit with the positioning through hole 712 and the first receiving hole 731. In some embodiments, a bottom portion of the locking member 740 may be provided with a second compression spring 741.

In some embodiments, the second pressing member 720 is received in the receiving chamber 711. The bottom portion of the second pressing member 720 may be provided with a corresponding number of pushing-abutting member 721 that fit with the positioning through holes 712. The pushing-abutting member 721 may be provided with a first compression spring 722. The first compression spring 722 may be disposed in between a bottom wall of the receiving chamber 711 and the second pressing member 720 and may be configured to abut against the bottom wall of the receiving chamber 711 and the second pressing member 720.

In some embodiments, a connecting hole 713 may be provided at a center of a lower portion of the first connecting part 710. The supporting member 620 may include the second connecting part 730. A second receiving hole 732 configured to connect with the connecting hole 713 may be provided at a center portion of the second connecting part 730. The locking assembly may also include a rotation shaft 733 disposed in the connecting hole 713 and the second receiving hole 732.

Figure 18:
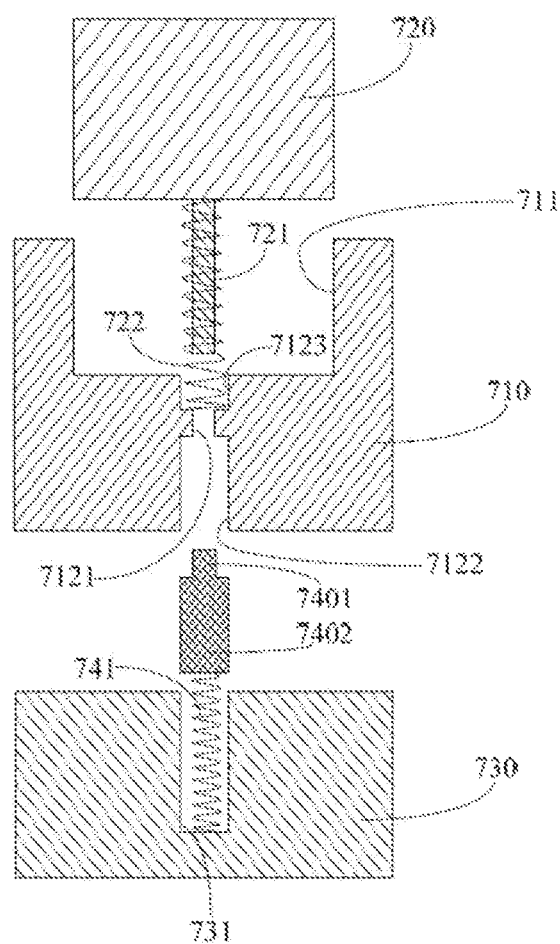
FIG. 18 is a schematic view of a status of the supporting assembly of the gimbal support frame during a rotation process, according to an example embodiment.
Figure 19:
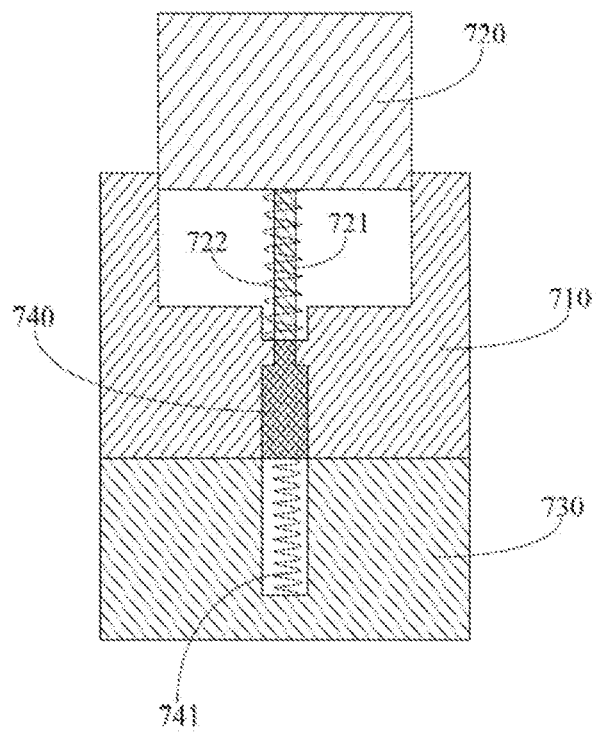
FIG. 19 is a schematic view of another status of the supporting assembly of the gimbal support frame during a rotation process, according to an example embodiment.
Figure 20:
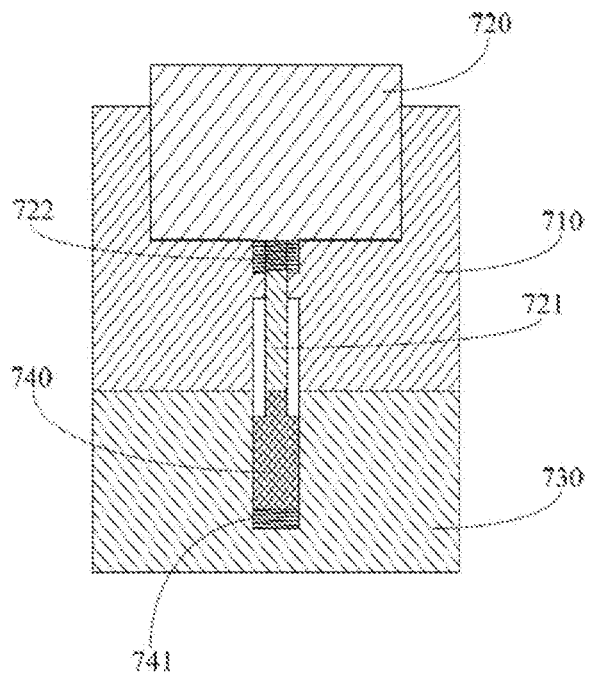
FIG. 20 is a schematic view of another status of the supporting assembly of the gimbal support frame during a rotation process, according to an example embodiment.
Figure 21:
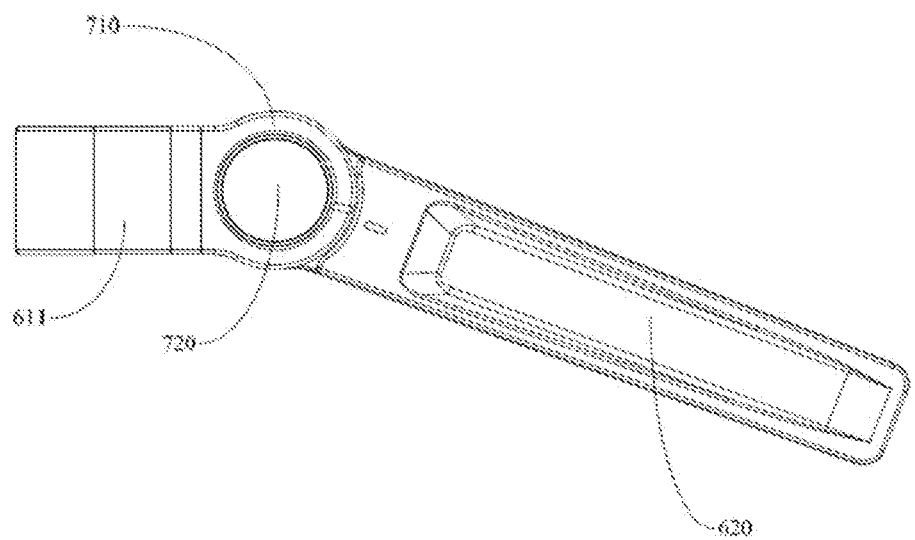
FIG. 21 is a schematic view of a status of a locking assembly of the supporting assembly of the gimbal support frame, according to an example embodiment.
Figure 22:
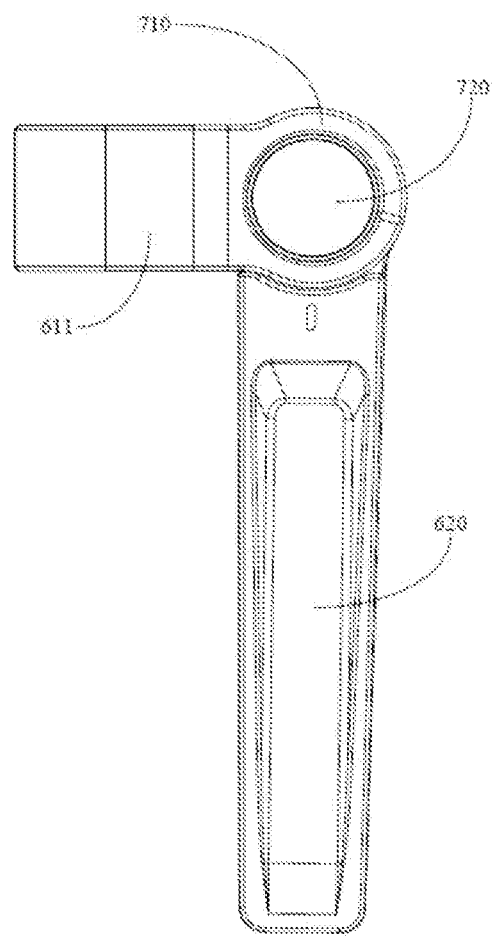
FIG. 22 is a schematic view of another status of a locking assembly of the supporting assembly of the gimbal support frame, according to an example embodiment.
Figure 23:
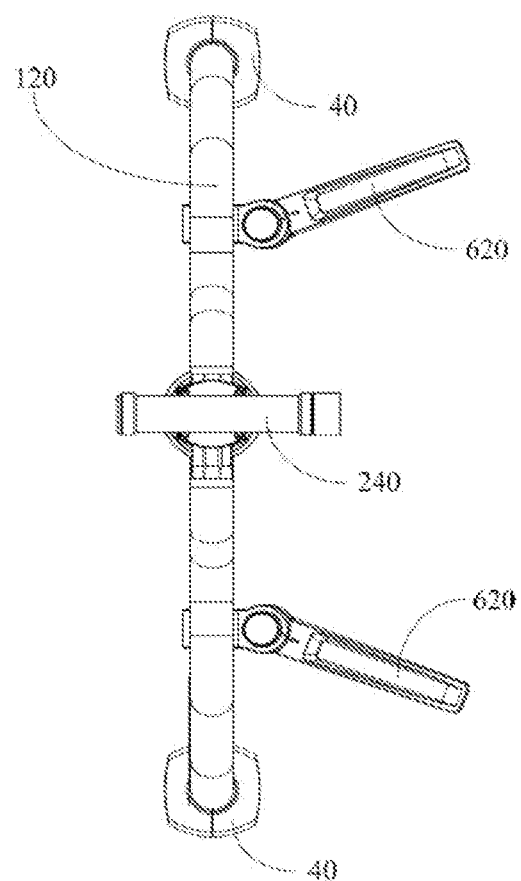
FIG. 23 is a schematic view of another status of a locking assembly of the supporting assembly of the gimbal support frame, according to an example embodiment.
Figure 24:
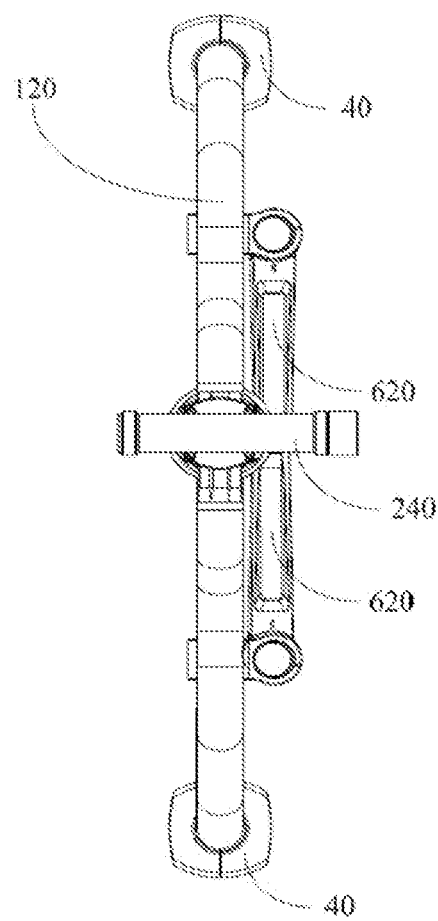
FIG. 24 is a schematic view of another status of a locking assembly of the supporting assembly of the gimbal support frame, according to an example embodiment.

As shown in FIG. 18-FIG. 20, in some embodiments, when the grasping member 610 and supporting member 620 are locked tightly, the locking member 740 may be located in the positioning through hole 712 under a force exerted by the second compression spring 741, which constrains the grasping member 610 and the supporting member 620 from rotating relative to one another, as shown in FIG. 18. When the second pressing member 720 is pressed down, the pushing-abutting member 721 of the second pressing member 720 may push the locking member 740 to move downwardly. When the pushing-abutting member 721 pushes the locking member 740 to move until exiting the positioning through hole 712, the grasping member 610 and the supporting member 620 may separate from one another. The supporting member 620 may rotate relative to the grasping member 610, as shown in FIG. 19. When the pressing force on the second pressing member 720 is released, the second pressing member 720 may move upwardly under a force exerted by the first compression spring 722, thereby causing the pushing-abutting member 721 to move upwardly. At this state, the locking member 740 may move upwardly under a force exerted by the second compression spring 741. When the locking member 740 moves again into the positioning through hole 712, the locking member 740 may again lock the grasping member 610 and the supporting member 620 tightly.

As shown in FIG. 18, in some embodiments, the positioning through hole 712 may be a stepped hole including a first-step hole portion 7121 and a second-step hole portion 7122. The first-step hole portion 7121 may be located at an upper portion of the second-step hole portion 7122 and may have a diameter that is smaller than a diameter of the second-step hole portion 7122. The pushing-abutting member 721 may fit with the first-step hole portion 7121. The locking member 740 may include a first locking part 7401 and a second locking part 7402. The first locking part 7401 may fit with the first-step hole portion 7121. The second locking part 7402 may fit with the second-step hole portion 7122. In some embodiments, the stepped hole may further include a third-step hole portion 7123 located at an upper portion of the first-step hole portion 7121 and having a diameter smaller than a diameter of the first-step hole portion 7121. The first compression spring 722 may abut in between the third-step hole portion 7123 and the second pressing member 720.

In some embodiments, a guiding block 734 and a guiding groove 714 may be disposed between the first connecting part 710 and the supporting member 620 for guiding the rotation direction of the supporting member 620. The guiding block 734 may be disposed on one of the first connecting part 710 and the supporting member 620. The guiding groove 714 may be disposed on the other one of the first connecting part 710 and the supporting member 620. In the embodiments shown in FIG. 15-FIG. 17, the guiding groove 714 may be disposed at a bottom of the first connecting part 710, and the guiding block 734 may be disposed on the second connecting part 730. In some embodiments, the guiding groove 714 may be a ring-shaped groove.

In some embodiments, the handheld ring 10 may include a ring-shaped tube structure including a tube. The handheld ring 10 may include at least a pair of positioning holes symmetrically disposed along a diameter direction of a tube of the handheld ring 10. The grasping member 610 may include a first grasping part 611 and a second grasping part 612 that are connected together. The first grasping part 611 and the second grasping part 612 may each include a positioning member 613 configured to fit with the positioning hole. In some embodiments, the supporting member 620 may include a supporting surface 621 configured to be disposed on a ground or other fixed surface. The supporting surface 621 may be disposed at a predetermined angle with respect to a plane on which the handheld ring 10 is located. In some embodiments, the predetermined angle may be within a range between 5° to 10°. For example, the predetermined angle may be 10°. The weight of the gimbal supporting frame 1 and the imaging device may be supported by the supporting assembly 60 to improve the stability of the gimbal supporting frame 1.

As shown in FIG. 21-FIG. 24, in some embodiments, the handheld ring 10 may include at least two supporting assemblies 60 evenly distributed at a lower portion of the handheld ring 10. In the embodiments shown in FIG. 21-FIG. 24, two supporting assemblies 60 are shown. When the gimbal supporting frame 1 needs to be placed on a ground, the two supporting assemblies 60 may be configured such that the span of the lower portions of the two supporting assemblies 60 is wider than the span of the upper portions of the two supporting assemblies 60. In such a configuration, the center of gravity of the gimbal supporting frame 1 is located on the supporting assemblies 60, which improves the stability of the gimbal supporting frame 1. When the gimbal supporting frame 1 needs to be stored or transported, the supporting members 620 of the two supporting assemblies 60 may be rotated relative to their respective grasping members 610 until the supporting members 620 are flush with the handheld 10. This may save space for storage or transportation.

Figure 25:
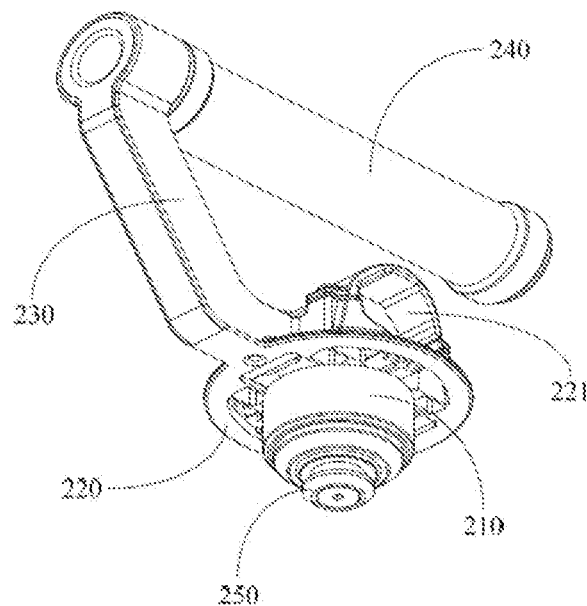
FIG. 25 is a perspective view of a handle of the gimbal support frame, according to an example embodiment.
Figure 26:
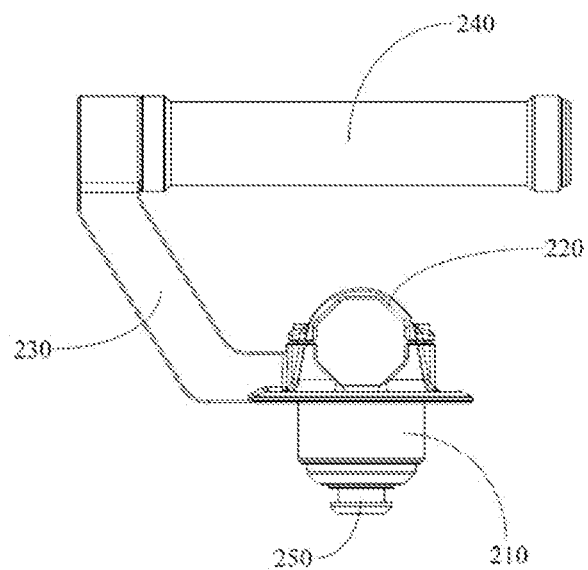
FIG. 26 is a front view of the handle of the gimbal support frame, according to an example embodiment.

The handle 20 of the gimbal supporting frame 1 will be described with reference to FIG. 25 and FIG. 26. As shown in FIG. 1, the handle 20 may be disposed at a center location of the mounting member 30. The handle 20 may include a mounting structure 210 configured to mount the imaging device. When the imaging device is mounted on the gimbal supporting frame 1, the location of the imaging device may be closer to the center of the handheld ring 10, which makes it convenient for the user to handhold and use the handheld ring 10. In some embodiments, the mounting structure 210 may include a quick-release locking member 250 configured to enable quick connection and release of the imaging device with and from the mounting structure 210.

In some embodiments, the handle 20 may include a connecting base 220 configured to connect with the mounting member 30, an adapter 230 configured to connect with the connecting base 220, and a handling member 240 configured to connect with the adapter 230. The connecting base 220 may include a position-limiting sleeve 221 configured to sleeve-fit with the mounting member 30. The position-limiting sleeve 221 may include an octagon shape. When a user uses the handle 20 for photographing, the handle 20 may satisfy the photographing needs of the user, such as one-shot. The position-limiting sleeve 221 may fix the positions of the handle 20 and the handheld ring 10, thereby fixing the position of the imaging device and avoiding the handle 20 rotating relative to the handheld ring 10 due to an inertial force, which may affect the quality of photographing.

A person having ordinary skills in the art can appreciate that the above descriptions merely describe some embodiments of the present disclosure, and do not limit the scope of the present disclosure in any manner. Any person having ordinary skills in the art can make modifications, variations, or replacements based on the disclosed technology without departing from the scope of the present disclosure. Such modifications, variations, or replacements are equivalent embodiments of the present disclosure, and fall within the scope of the present disclosure. The scope of the present disclosure is defined by the following claims and the equivalents.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A gimbal supporting frame, comprising:
 a handheld ring comprising:
   a supporting assembly disposed at a lower portion of the handheld ring; and
   a mounting member configured to mount an imaging device and provided at an upper portion of the handheld ring,
 wherein the mounting member is configured to protrude upwardly relative to a rest of the handheld ring and is located at a center location of the upper portion of the handheld ring.

2. The gimbal supporting frame of claim 1, further comprising:
 a blocking support member configured to sleeve-fit with the handheld ring and movable along the handheld ring,
 wherein the blocking support member comprises a first blocking support part, a second blocking support part, and a connecting assembly configured to connect the first blocking support part and the second blocking support part, and
 wherein the connecting assembly is configured to adjust the first blocking support part and the second blocking support part to tighten or loosen the handheld ring.

3. The gimbal supporting frame of claim 2,
 wherein the connecting assembly comprises an abutting member disposed in the first blocking support part and a first pressing member disposed in the second blocking support part and connected with the abutting member, wherein a first end of the abutting member is provided with an abutting part configured to abut against the handheld ring, and a second end of the abutting member is provided with an elastic part configured to abut against the first blocking support member, and wherein the first pressing member comprises a pressing part protruding from the second blocking support part.

4. The gimbal supporting frame of claim 2, wherein a first end of the first blocking support part and an end of the second blocking support part are hinge connected, wherein the connecting assembly comprises a first adjusting member disposed at a second end of the first blocking support part, and wherein the first adjusting member is configured to change an angle between the first blocking support part and the second blocking support part.

5. The gimbal supporting frame of claim 4, wherein the connecting assembly further comprises a rotation assembly, wherein the first adjusting member comprises a cam, wherein two ends of the rotation assembly are rotatably connected with the cam and the second end of the first blocking support part, respectively, wherein a receiving groove corresponding to the cam is provided on an outer surface of the second blocking support part, wherein the cam is configured to be received in the receiving groove when the rotation assembly rotates around the second end of the first blocking support part, wherein when the cam is received in the receiving groove, the first blocking support part and the second blocking support part are connected with one another, wherein the cam is configured to abut against the receiving groove when the cam rotates around the rotation assembly, and wherein when the cam abuts against the receiving groove while the cam rotates around the rotation assembly, the first blocking support part and the second blocking support part are connected together to tightly clamp the handheld ring.

6. The gimbal supporting frame of claim 5, wherein the cam comprises a cam abutting support member and a cam handle, wherein the receiving groove comprises an abutting groove corresponding to the cam abutting support member and a receiving notch configured to receive the cam handle, wherein the cam handle is received in the receiving notch, wherein the cam abutting support member is configured to abut against the abutting groove when the cam abutting support member rotates, and wherein when the cam abutting support member abuts against the abutting groove, the first blocking support part and the second blocking support part are connected to tightly clamp the handheld ring.

7. The gimbal supporting frame of claim 2, wherein the connecting assembly comprises a fixing member disposed in the first blocking support part and a second adjusting member connected with the fixing member and disposed in the second blocking support part, wherein the fixing member comprises a threaded connecting hole, and wherein the second adjusting member comprises a threaded connecting part configured to fit with the threaded connecting hole.

8. The gimbal supporting frame of claim 1, wherein the handheld ring comprises a ring-shaped tube structure including a first tube and a second tube detachably connected with the first tube.

9. The gimbal supporting frame of claim 8, wherein the first tube comprises a threaded sleeve tube, wherein an outer surface of the second tube comprises a threaded connecting member configured to fit with the threaded sleeve tube, and wherein the threaded sleeve tube is configured to engage with the threaded connecting member to pull the first tube and the second tube tightly together or to loosen the connection between the first tube and the second tube.

10. The gimbal supporting frame of claim 9, wherein the first tube comprises a position limiting block, wherein the second tube comprises a position limiting groove configured to fit with the position limiting block, and wherein when the first tube and the second tube are connected, the position limiting block is disposed in the position limiting groove.

11. The gimbal supporting frame of claim 10, wherein the first tube comprises a first embedded member embedded on the first tube, wherein the position limiting block is disposed on the first embedded member, wherein the second tube comprises a second embedded member embedded on the second tube, and wherein the position limiting groove is disposed on the second embedded member.

12. The gimbal supporting frame of claim 1, wherein the supporting assembly comprises a grasping member configured to sleeve-fit with a lower portion of the handheld ring, and a supporting member configured to movably connect with the grasping member, and wherein an angle between the supporting member and the grasping member is adjustable.

13. The gimbal supporting frame of claim 12, wherein the grasping member comprises a first connecting part, and wherein the supporting member is configured to rotatably connect with the first connecting part and is configured to be lockable at a predetermined rotation angle.

14. The gimbal supporting frame of claim 13, wherein an elastic abutting member is disposed between the first connecting part and the supporting member, wherein a receiving member configured to receive the elastic abutting member is disposed on one of the first connecting part and the supporting member, wherein the first connecting part and the supporting member are locked together when the elastic abutting member is received in the receiving member, and wherein the supporting member is configured to rotate relative to the first connecting part when the elastic abutting member is compressed to exit the receiving member.

15. The gimbal supporting frame of claim 14, wherein a guiding block is disposed on one of the first connecting part and the supporting member, and wherein a guiding groove is disposed on the other one of the first connecting part and the supporting member.

16. The gimbal supporting frame of claim 14, further comprising:

a second pressing member configured to compress the elastic abutting member until the elastic abutting member exits the receiving member, wherein the second pressing member is disposed on the first connecting part.

17. The gimbal supporting frame of claim 12,
wherein the handheld ring comprises a ring-shaped tube structure,
wherein the lower portion of the handheld ring is provided with at least a pair of positioning holes symmetrically disposed along a diameter direction of a tube of the ring-shaped structure, and
wherein the grasping member is provided with a positioning member configured to fit with the positioning hole.

18. The gimbal supporting frame of claim 17,
wherein the supporting member comprises a supporting surface, and
wherein the supporting surface is disposed at a predetermined angle relative to a plane on which the handheld ring is located.

19. The gimbal supporting frame of claim 12,
wherein the handheld ring comprises at least two supporting assemblies evenly distributed at the lower portion of the handheld ring.

20. The gimbal supporting frame of claim 1, further comprising a handle disposed at a center location of the mounting member, the handle comprising a handling member and a mounting structure configured to mount the imaging device.

* * * * *